(12) United States Patent
Mahapatra et al.

(10) Patent No.: US 9,830,177 B1
(45) Date of Patent: Nov. 28, 2017

(54) COMPUTER IMPLEMENTED METHOD AND SYSTEM, AND COMPUTER PROGRAM PRODUCT, FOR DETERMINING COMPLIANCE WITH A CONFIGURATION PARAMETER BEFORE DEPLOYMENT OF A VIRTUAL APPLIANCE INTO A NETWORK APPLIANCE

(71) Applicant: VCE Company, LLC, Richardson, TX (US)

(72) Inventors: Akshaya Mahapatra, Richardson, TX (US); Zunhe Jin, Richardson, TX (US); Anantha Mohan Raj Durai Raj Murugandi, Richardson, TX (US); Boyu Wang, Richardson, TX (US)

(73) Assignee: VCE Company, LLC, Richardson, TX (US)

( * ) Notice: Subject to any disclaimer, the term of this patent is extended or adjusted under 35 U.S.C. 154(b) by 591 days.

(21) Appl. No.: 14/078,233

(22) Filed: Nov. 12, 2013

(51) Int. Cl.
*G06F 9/46* (2006.01)
*G06F 9/455* (2006.01)

(52) U.S. Cl.
CPC .......... *G06F 9/45533* (2013.01); *G06F 9/455* (2013.01)

(58) Field of Classification Search
None
See application file for complete search history.

(56) References Cited

U.S. PATENT DOCUMENTS

| 7,313,512 B1* | 12/2007 | Traut | G06Q 10/0631 703/23 |
| --- | --- | --- | --- |
| 2008/0134176 A1* | 6/2008 | Fitzgerald | G06F 9/45537 718/1 |
| 2009/0217296 A1* | 8/2009 | Gebhart | G06F 9/45558 719/317 |
| 2009/0228984 A1* | 9/2009 | Sterin | G06F 21/105 726/26 |
| 2009/0249329 A1* | 10/2009 | Dash | G06F 8/61 718/1 |
| 2009/0328225 A1* | 12/2009 | Chambers | G06F 21/10 726/26 |
| 2010/0138898 A1* | 6/2010 | He | G06F 9/455 726/3 |
| 2011/0004676 A1* | 1/2011 | Kawato | G06F 9/5044 709/221 |
| 2012/0131578 A1* | 5/2012 | Ciano | G06F 9/45558 718/1 |
| 2012/0203927 A1* | 8/2012 | Jujjuri | G06F 17/30091 709/238 |

(Continued)

*Primary Examiner* — Bradley Teets
(74) *Attorney, Agent, or Firm* — Jeffrey R. McFadden, Esq.; Womble Carlyle Sandridge & Rice, LLP

(57) ABSTRACT

A method, system and computer readable media for deploying a virtual appliance are provided. The method includes receiving values of input parameters of a configuration file of a virtual appliance. The method includes for one of the values, determining, prior to activating the virtual appliance, whether the one of the values is in compliance with a configuration of one or more appliances. The method includes deploying the virtual appliance into the one or more appliances. In response to determining that the one of the values is in compliance, the method includes configuring the virtual appliance in accordance with the one of the values, wherein the determining is executed through a processor.

15 Claims, 5 Drawing Sheets

(56) References Cited

U.S. PATENT DOCUMENTS

| | | | | |
|---|---|---|---|---|
| 2013/0305244 A1* | 11/2013 | Pohlmann | ............... | G06F 9/455 |
| | | | | 718/1 |
| 2013/0346736 A1* | 12/2013 | Cook | ................... | G06F 9/4416 |
| | | | | 713/2 |
| 2014/0201481 A1* | 7/2014 | Marulkar | ................ | G06F 21/80 |
| | | | | 711/162 |
| 2015/0113530 A1* | 4/2015 | Arcese | ................ | G06F 9/45558 |
| | | | | 718/1 |

* cited by examiner

COMPUTER IMPLEMENTED METHOD AND SYSTEM, AND COMPUTER PROGRAM PRODUCT, FOR DETERMINING COMPLIANCE WITH A CONFIGURATION PARAMETER BEFORE DEPLOYMENT OF A VIRTUAL APPLIANCE INTO A NETWORK APPLIANCE

BACKGROUND

Many products are distributed as virtual appliances, which need to be imported to a virtualized environment. Typically, each virtual appliance consists of a group of virtual machines, each of which gets created in the virtualized environment after the virtual appliance is imported. Generally, a virtual machine as implemented as a software module executing on a network appliance (i.e., a physical device), which could include one or more computers and one or more storage devices on a network. Each virtual appliance may use a custom method for Internet Protocol (IP) address assignment. Internet Protocol assignment in Windows is different from Internet Protocol assignment in Linux. Usually, the virtual appliance is installed and configured manually, using a process of trial and error. A user may discover errors after powering on, i.e., activating, a virtual machine. These errors could include finding that the virtual local area network (VLAN) for a port group doesn't exist on a network switch, finding that a data store has only read access but not write access, or finding that a host name is already in use or mapped to a different IP address, among other possibilities. Other issues include a gateway not being accessible. A server organizational unit (OU) might not have permission to add a host name, or the OU might not be available in a domain name server (DNS) server.

SUMMARY

In some embodiments, a method for deploying a virtual appliance is provided. The method includes receiving values of input parameters of a configuration file of a virtual appliance. The method includes for one of the values, determining, prior to activating the virtual appliance, whether the one of the values is in compliance with a configuration of one or more appliances. The method includes deploying the virtual appliance into the one or more appliances. In response to determining that the one of the values is in compliance, the method includes configuring the virtual appliance in accordance with the one of the values, wherein the determining is executed through a processor. A computer readable media and a system are also provided.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A virtual appliance deployment system and related method provide a solution to the above-discussed problems, by automating the deployment of a virtual appliance. A virtual appliance is generally implemented as one or more modules embodying one or more virtual machines of the virtual appliance. The modules are to be installed in one or more network appliances that are operating in an existing network. The virtual appliance is readily deployed into the one or more network appliances and the network, by the virtual appliance deployment system or by practicing the related method.

Values for input parameters to configure the virtual appliance are validated against the configuration of the existing network appliance(s) and the existing network. The virtual appliance is installed into the existing network appliance(s) and the existing network, and the virtual appliance is configured using the previously validated values for input parameters. These and further actions can be performed in an automated manner by the virtual appliance deployment system or by a specially programmed processor, for example. Activation of the configured virtual appliance follows. The configuration and status of the virtual appliance can then be displayed.

Figure 1:
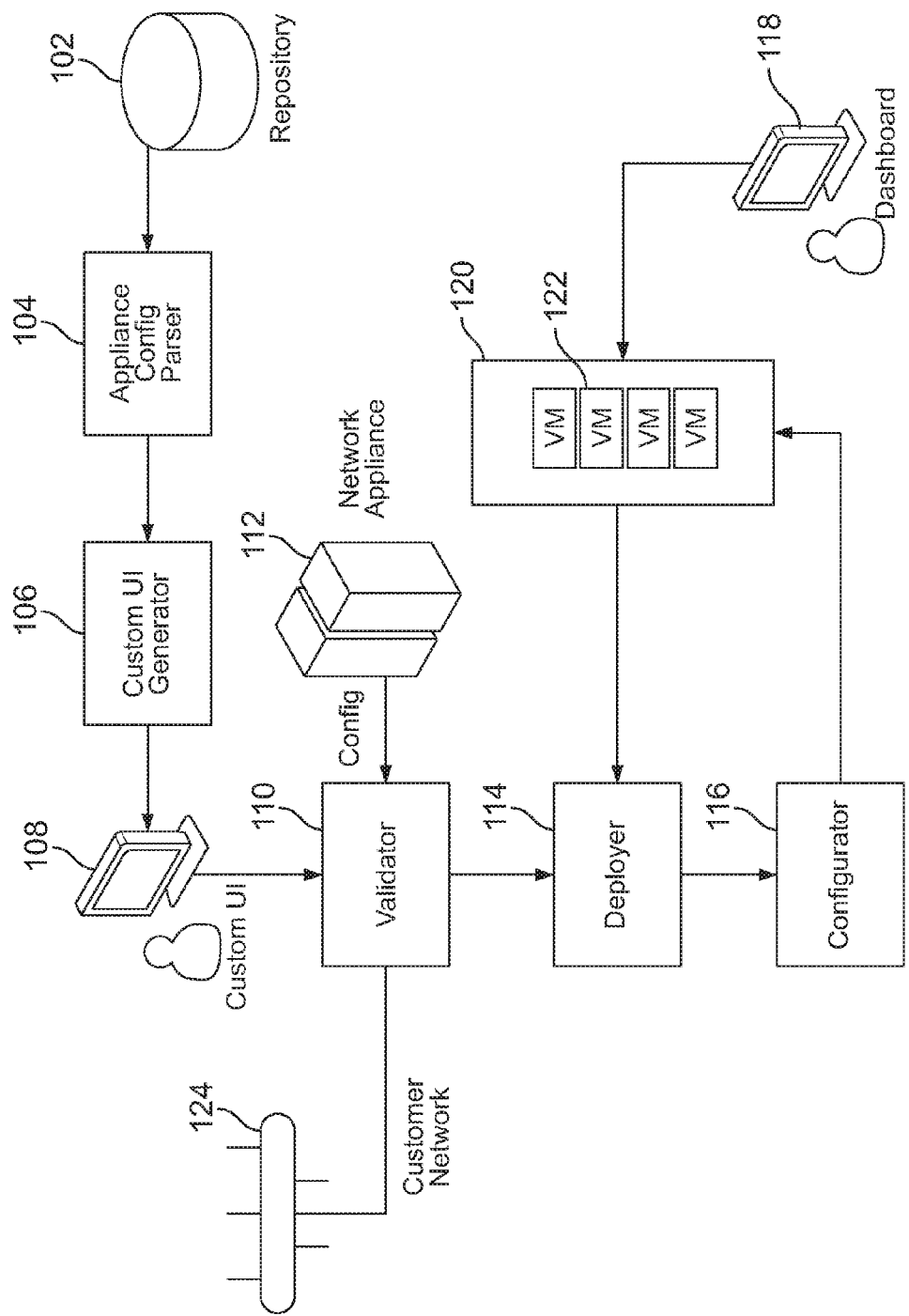
FIG. 1 is a system diagram showing an embodiment of a virtual appliance deployment system in accordance with some embodiments.

FIG. 1 is a system diagram showing an embodiment of a virtual appliance deployment system in accordance with the present disclosure. The virtual appliance deployment system can be implemented as one or more modules installed on and executing in one or more network appliances or other specially programmed computer(s) or processor(s). As with the virtual appliances and virtual machines with which the virtual appliance deployment system works, the virtual appliance deployment system can be installed in a single machine, or spread across multiple machines, or can be installed in one or more virtual machines or virtual appliances, which in turn can be implemented in a single physical machine or spread across multiple physical machines, etc. In the example shown, an embodiment of the virtual appliance deployment system could be installed in a first network appliance 112, or could be installed in a second network appliance residing elsewhere in a customer network 124.

In the example shown in FIG. 1, a virtual appliance 120, made up of several virtual machines 122, is to be installed in a network appliance. The network appliance could be, for example, network appliance 112, or another network appliance residing elsewhere in the network 124. In either case, the network appliance 112 is in an existing installation in an existing network 124. The network appliance 112 could include a single machine, or multiple machines, and may be physical machines or virtual machines. It should be appreciated that network appliance 112 may be any suitable physical or virtual appliance that may be coupled to a network.

The virtual machines 122 of the virtual appliance 120 are embodied in one or more modules, which could take the form of one or more files such as an .ovf file or an .ova file. Typically, a virtual appliance 120 has a configuration file, with input parameters. Supplying values for the input parameters of the configuration file configures the virtual appliance 120. This configuration is usually done in a process suited to the particular virtual appliance and the operating system of the physical machine or machines into which the virtual appliance is installed.

However, the virtual appliance deployment system performs preprocessing, and determines the input parameters of the configuration file in advance of activation of the virtual appliance. In the embodiment shown, the virtual appliance deployment system includes an appliance configuration parser 104, which could be implemented as a module installed on a network appliance, e.g., network appliance 112 or a network appliance elsewhere on the existing network 124. The appliance configuration parser 104 parses the appliance configuration file, which could be an .ovf file or an .ova file obtained from a repository 102, to identify the input parameters of the configuration file. Input parameters of the configuration file could relate to, for example, an Internet Protocol (IP) address, a domain name server (DNS), a gateway, a secondary domain name server, a database server, a data store, a logical unit number (LUN), a network file system (NFS) server, a host name, etc. These input parameters use values that are provided by a user, to customize and configure the network appliance 120. These values could include values of network parameters from, for example, an Internet Protocol, a domain name server (DNS), a virtual local area network (VLAN), a port group, or a gateway.

Still referring to FIG. 1, the virtual appliance deployment system includes a custom user interface generator 106, which could be implemented as a module installed on a network appliance, e.g., network appliance 112 or a second network appliance elsewhere on the existing network 124. The custom user interface generator 106 generates a custom user interface 108 based on the input parameters of the virtual appliance 120, which are communicated from the appliance configuration parser 104. An example user interface will be discussed with reference to FIG. 2. A user can enter input parameters intended for the configuration of the network appliance 120, via the user interface 108. In one embodiment, the custom user interface generator 106 generates a user interface 108 that supports a user reconfiguring the virtual appliance.

Continuing as shown in FIG. 1, one embodiment of the virtual appliance deployment system includes a validator 110, which could be implemented as a module installed on a network appliance, e.g., network appliance 112 or a second network appliance elsewhere on the existing network 124. The validator 110 accesses configuration information of network appliances and the network 124, for example by communicating with the first network appliance 112 or other network appliances on the network 124. Also, the validator 110 accesses the values for the input parameters of the virtual appliance 120, for example by requesting these values from the custom user interface generator 106. The custom user interface generator 106 then requests user input of the values. Other types of access are readily devised, in accordance with the teachings herein. The validator 110 determines whether values for the input parameters of the virtual appliance 120 to be deployed are compliant with the configuration information of the network appliances and the network 124. In one embodiment, the validator 110 does so without user intervention, i.e., the validator 110 performs the determination of compliance as an automatic process. The determination of compliance, i.e., validation of the values for the input parameters of the virtual appliance 120, is performed prior to activating the virtual appliance 120 in some embodiments.

For example, the validator 110 could ensure that an Internet Protocol (IP) address assigned to the virtual appliance 120 does not conflict with the network 124. The validator 110 could ensure that sufficient capacity to support addition of virtual machines 122 to a domain exists in one or more domain name server (DNS) servers. The validator 110 could ensure that sufficient capacity to support addition of virtual machines 122 to a domain exists in a server organizational unit (OU). The validator 110 could ensure that a data store has correct permission to read and write. The validator 110 could ensure that a logical unit number (LUN) has correct permission to read and write. The validator 110 could ensure that a network file system (NFS) server and a path relating to the server are correct for creating and editing a NFS file system. The validator 110 could validate whether a host name is present in a domain. In some embodiments, the validator 110 outputs an indication of an error when the validator 110 detects an incompatibility between one of the values of the input parameters and the configuration of network appliances and the network 124, i.e., detects that one of the values for the input parameters is not compliant with the configuration information of the network appliances and the network 124. It should be appreciated that the above examples are not meant to be limiting as validator 110 may determine compliance for additional parameters not listed in the above examples.

In the embodiment shown in FIG. 1, the virtual appliance deployment system includes a deployer 114, which could be implemented as a module installed on a network appliance, e.g., network appliance 112 or another network appliance elsewhere on the existing network 124. The deployer 114 imports the modules 122 of the virtual appliance 120 into one or more network appliances 112 in the network 124. For example, the deployer 114 could load the modules from the repository 102, and write the modules into a network storage or other memory communicating with a network appliance. It should be appreciated that repository 102 may be any suitable storage device. The deployer 114 could apply unrolling, decryption, extraction or other operations to one or more files as appropriate for importing the virtual appliance 120. In one embodiment, the deployer 114 deploys the virtual appliance 120 after the validator 110 determines whether the values of the input parameters are in compliance.

In the embodiment shown in FIG. 1, the virtual appliance deployment system includes a configurator 116, which could be implemented as a module installed on a network appliance, e.g., the first network appliance 112 or the second network appliance elsewhere on the existing network 124. The configurator 116 configures the modules 122 of the virtual appliance 120 in compliance with the network appliances, e.g., network appliance 112, and the network 124. The configurator 116 does so by installing the values determined by the validator 110 to be compliant with the configuration information of the network appliances and the network 124 into the network appliances. For example, the configurator 116 could install or load the compliant values by communicating with the validator 110 and writing the values into a network appliance, into a memory associated or communicating with the network appliance, into multiple network appliances, or into a network storage with which the network appliances communicate, etc. In one embodiment, the configurator 116 configures the virtual appliance after the validator 110 determines whether the values of the input parameters are in compliance.

After the modules of the virtual appliance 120 are imported and configured, the virtual appliance 120 is in compliance with the network appliances and the network 124, and can be activated. The virtual appliance 120 can also be reconfigured, through application of new values for the input parameters. As with the initial set of values for the input parameters, the validator 110 determines whether the new values for the input parameters of the virtual appliance 120 are compliant with the configuration information of the network appliances in the network 124, in one embodiment. For example, the new values for the input parameters could be input through the custom user interface 108 as generated by the custom user interface generator 106. In one embodiment, the validator 110 can be bypassed, and the new values for the input parameters can be input directly for a reconfiguration of the virtual appliance 120.

In the embodiment shown in FIG. 1, the virtual appliance deployment system includes a dashboard generator 118, which could be implemented as a module installed on a network appliance 112. The dashboard generator 118 generates a display showing the configuration applied to the virtual appliance 120, and the status of the virtual appliance 120. This would generally be the current, most recent or final configuration, although further embodiments could show a history of configurations.

Figure 2:
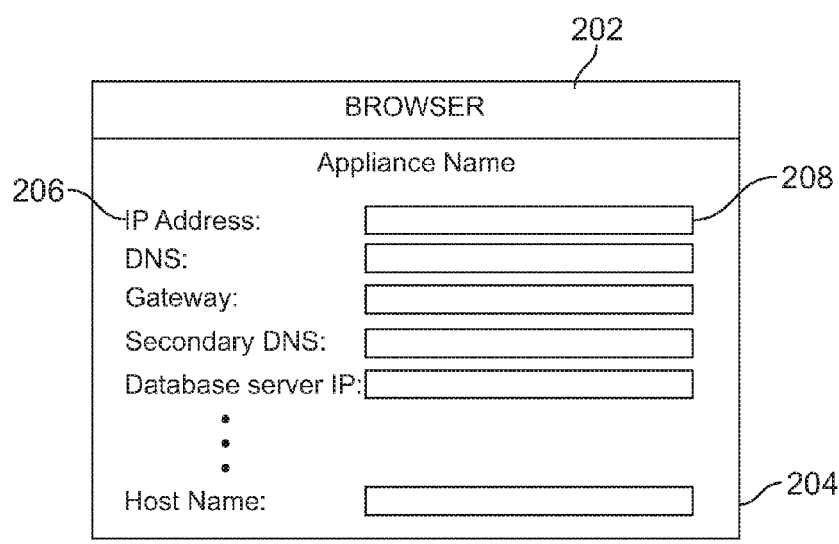
FIG. 2 is a screenshot of an example user interface for entering values for input parameters of a virtual appliance in accordance with some embodiments.

FIG. 2 is a screenshot of an example user interface for entering values for input parameters of a virtual appliance. The custom user interface 108, as generated by the custom user interface generator 106, could have various formats, such as a menu, a dialog box, drop-down menus, a series of questions or other prompts, etc. The custom user interface 108 is populated by parameters obtained from communication with the appliance configuration parser 104. In the example shown, the custom user interface presents a webpage 204, as seen through a browser 202. Any of a variety of available browsers could be applied, as appropriate to an installation and an operating system. In the webpage 204, a title shows the appliance name. The names of various input parameters 206 are shown, along with respective entry fields 208 for the values of the input parameters 206. Example input parameters include Internet protocol (IP) address, domain name server (DNS), Gateway, Secondary DNS, Database server IP, hostname, etc. A user enters these values in the customary manner, such as by clicking on the entry field 208 and typing, or copying and pasting appropriate data into the entry field 208. Other forms of entry are readily devised. In a further example, the values of the input parameters could be provided from a document, a file or other data source. Values of the input parameters could be retrieved from a webpage, such as hosted by the manufacturer. Alternatively, values of the input parameters could be generated by an artificial intelligence application.

Figure 3:
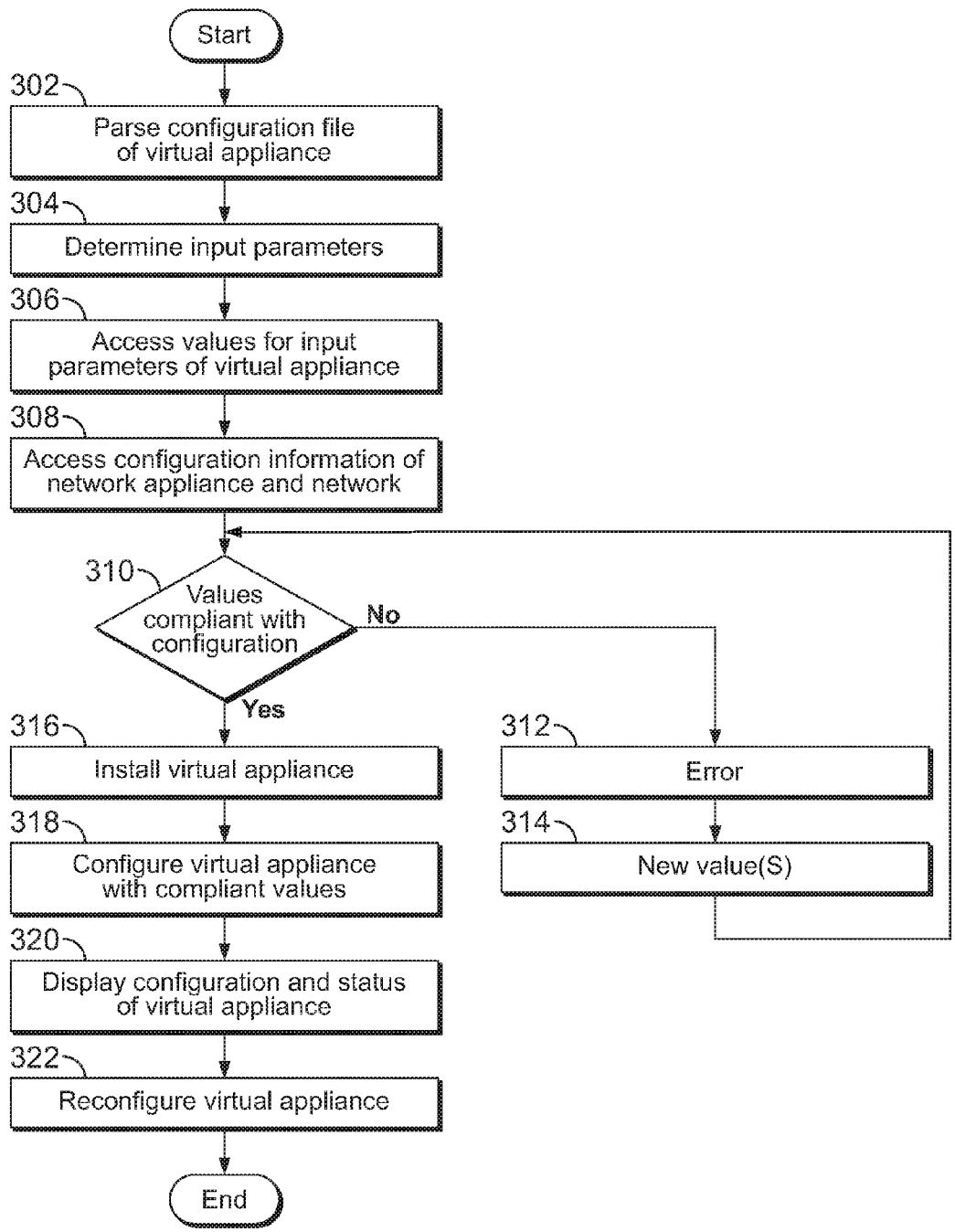
FIG. 3 is a flow diagram of a method of deploying a virtual appliance, which can be practiced on or by the virtual appliance deployment system of FIG. 1, using the user interface of FIG. 2 in accordance with some embodiments.

FIG. 3 is a flow diagram of a method of deploying a virtual appliance, which can be practiced on or by the virtual appliance deployment system of FIG. 1, using the user interface of FIG. 2. A specially programmed processor can also practice the method. Examples are given below of how actions of the method can be implemented in some embodiments. A configuration file of a virtual appliance is parsed, in an action 302. For example, the configuration file could be an .ovf file or an .ova file, or could include or be included in one of these. The configuration file could be parsed by the appliance configuration parser of FIG. 1 in some embodiments. The configuration file could be obtained from a repository, or other storage source.

Input parameters of the configuration file are determined, in an action 304. For example, the appliance configuration parser could determine the input parameters of the configuration file, as a result of parsing the configuration file. As noted above, values of the input parameters are what determine the configuration of the virtual appliance. Values for the input parameters of the virtual appliance are accessed, in an action 306. For example, the custom user interface generator of FIG. 1 could generate a custom user interface as illustrated in FIG. 2, through which a user enters values for the input parameters of the configuration file. Input parameters could also be provided from an alternative source in some embodiments. The validator of FIG. 1 may perform the access.

Configuration information of one or more network appliances and a network in which the one or more network appliances reside is accessed in an action 308. For example, the validator could access memory storage, a register, a file, or other data source to find the configuration information. In some embodiments, the validator could send a ping to validate network infrastructure, such as by testing to see whether a network appliance at an Internet Protocol address responds. In a decision action 310, it is determined if the values for the input parameters of the virtual appliance are compliant with the configuration of the network appliance(s) and the network. For example, the validator could determine whether an Internet Protocol address provided as a value for an input parameter for configuring the virtual appliance is already in use elsewhere in the network. The validator could determine whether a data store, pointed to by one of the values for an input parameter for configuring the virtual appliance, has the correct permission to read and write as needed by the virtual appliance. Other types of validations and other techniques to perform validations, of the values for the input parameters of the virtual appliance are readily devised in accordance with the teachings herein.

If it is determined in decision action 310 that there is at least one value of an input parameter for the virtual appliance that is not compliant with the configuration of the network appliance(s) and the network, the flow of the method branches to the action 312. In the action 312, an error is indicated. For example, an error message could be sent or displayed through the custom user interface. In an action 314, a new value, or new values as appropriate, is accessed. For example, a user upon viewing the error could input a new value for the input parameter. In a further embodiment, a new value for the input parameter could be generated by an artificial intelligence routine or other module. Flow then continues back to the decision action 310, for determination of compliance of the new value(s).

If it is determined in the decision action 310 that the values of the input parameters for the virtual appliance are compliant with the configuration of the network appliance(s) and the network, the flow branches to the action 316. In the action 316, the virtual appliance is installed. For example, the deployer could import the modules of the virtual appliance into one or more network appliances in the network. The deployer could do so by writing the file or files embodying the virtual appliance into an appropriate memory of, or communicating with, one or more of the network appliances in the network.

The virtual appliance is configured with compliant values, in an action 318. For example, the configurator of FIG. 1 could access the values for the input parameters, which the validator determined are compliant with the configuration of the network appliance(s) and the network. The configurator can write these values or derivatives of them into the appropriate memory, or send these values to the appropriate network appliance(s). The configurator could be set up to perform various differing processes as appropriate to initialize and configure specific virtual appliances. The configuration and status of the virtual appliance are displayed, in an action 320. For example, the custom user interface of FIG. 2 could display the present, most recent or final configuration of the virtual appliance in an appropriate format. The custom user interface could display the status of the virtual appliance in an appropriate format. The virtual appliance could be activated before or after the initial display of status.

In some versions, and depending upon circumstances, the virtual appliance could be reconfigured in an action 322. For example, the custom user interface could allow entry of one or more new values for input parameters of the virtual appliance, in order to reconfigure the virtual appliance. The validator could validate the new value or values. The configurator could apply the new value or values in a manner similar to the original application. Some virtual appliances may provide a mechanism for reconfiguring, which could be used as is or integrated with the custom user interface. In addition, changing the configuration or reconfiguring a virtual appliance may impact some other appliance or portion of the network and the embodiments may identify values that may not be compliant from the change/reconfiguration through action 310 in some embodiments.

Figure 4:
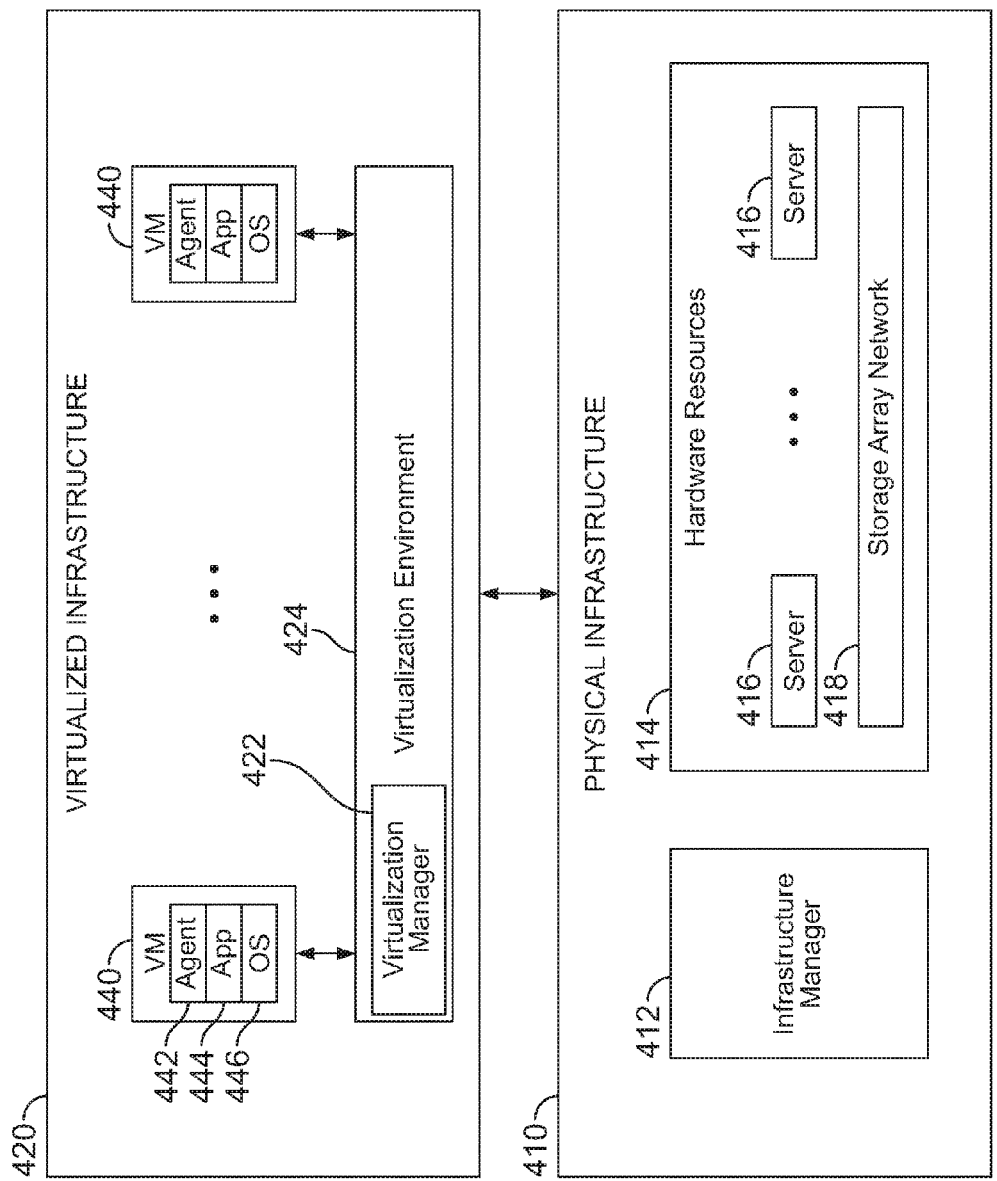
FIG. 4 is a schematic diagram of virtualized infrastructure and physical infrastructure suitable for the virtual appliance deployment system of FIG. 1 in accordance with some embodiments.

FIG. 4 is a schematic diagram of virtualized infrastructure and physical infrastructure suitable for the virtual appliance deployment system of FIG. 1. In the physical infrastructure 410, an infrastructure manager 412 interacts with and manages hardware resources 414. The hardware resources 414 include servers 416 and a storage array network 418. The servers 416 and the storage array network 418 are networked. In the virtualized infrastructure 420, virtual machines 440 are implemented in a virtualization environment 424, which is managed by a virtualization manager 422. Each virtual machine 440 may contain some or all of an agent 442, an application 444, and an operating system 446. The virtualized infrastructure 420 can include one or many virtual machines 440, which are physically implemented as modules executing in the hardware resources 414. A virtual appliance, which is being deployed by the virtual appliance deployment system, could take the form of one or more virtual machines 440. The virtual appliance deployment system could take the form of one or more modules executing on one or more of the servers 416, could take the form of a virtual machine 440, or could take the form of a virtual appliance having one or more virtual machines 440. In some embodiments, the physical infrastructure 410 can be implemented with a Vblock™ System available from the VCE Company LLC of Richardson, Tex. The virtualization manager 422 can be implemented with the VMware vCenter virtualized management platform available from VMware, Inc., of Palo Alto, Calif. in some embodiments. A virtualized environment can be implemented in the virtualization environment 424 using VMware vSphere or VMware ESX-based hypervisor technologies on servers in some embodiments. In some embodiments, hardware resources 414 may be clustered and in other embodiments, virtualized clusters may exist in virtualization environment 424. It should be appreciated that the embodiments described herein may be extended to any virtualized environment/hypervisor and are not limited to a VMware ESX-based hypervisor in this example. It should be further appreciated that a module as used herein may be software, firmware, hardware, or any combination of the three.

Figure 5:
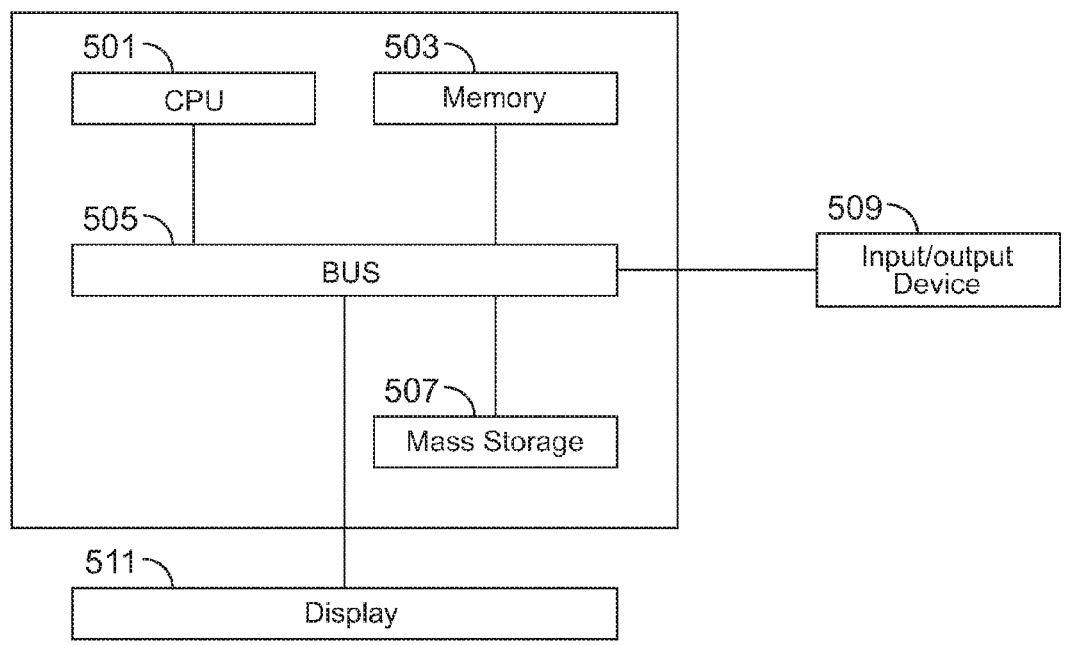
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for deploying virtual appliances in accordance with some embodiments. The computing device includes a central processing unit (CPU) 501, which is coupled through a bus 505 to a memory 503, and mass storage device 507. Mass storage device 507 represents a persistent data storage device such as a disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable media or medium such as memory 503 or mass storage device 507 in some embodiments. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools, user interfaces, or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a non-transitory, tangible, computer readable media. The computer readable media is any data storage device that can store data, which can be thereafter read by a computer system. Examples of the computer readable media include hard drives, network attached storage (NAS), read-only memory, random-access memory, DVD, CD-ROMs, CD-Rs, CD-RWs, magnetic tapes, flash, and other optical and non-optical data storage devices. The computer readable media can also be distributed over a network coupled computer system so that the computer readable code is stored and executed in a distributed fashion. Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for deploying a virtual appliance into a network appliance, comprising:
   receiving a first configuration file of a virtual appliance, wherein the first configuration file is comprised of values for one or more input parameters for the virtual appliance comprises one or more virtual machines deployed in a first network appliance;
   parsing, from the first configuration file, a value for each of the one or more input parameters for the virtual appliance;
   accessing a second configuration file for a second network appliance, wherein the second network appliance is an existing network appliance, wherein the second configuration file is comprised of values for the one or more input parameters for the second network appliance;
   determining, prior to deploying the virtual appliance, that the virtual appliance is in compliance with the second configuration file, wherein the determining compliance comprises determining that a value for at least one input parameter parsed from the first configuration file is the same as a value for a corresponding input parameter accessed from the second configuration file, wherein the at least one input parameter is selected from a group consisting of: an Internet protocol, a domain name server (DNS), a virtual local area network (VLAN), a port group, and a gateway;
   wherein the step of determining compliance is further comprised of one or more of the following steps:
      determining that an Internet protocol address assigned to the virtual appliance does not conflict with another Internet protocol address;
      determining that one or more DNS servers possesses sufficient capacity to support the one or more virtual machines of the virtual appliance;
      determining that a data store has correct permissions to read and write;
      determining that a logical unit number (LUN) has correct permissions to read and write; and
      determining that a network file system (NFS) server and path relating to the NFS server are correct for creating and editing a NFS file system;
   deploying, in response to determining compliance, the virtual appliance into the first network appliance; and configuring the virtual appliance in accordance with the value for the at least one input parameter parsed from the first configuration file;

wherein at least one step is executed by a processor.

2. The method of claim 1, further comprising:
determining the input parameters of the first configuration file, wherein input parameters are identified; and
requesting the values of the input parameters.

3. The method of claim 1, further comprising:
displaying a configuration of the virtual appliance; and
displaying a status of the virtual appliance.

4. The method of claim 1, wherein the deploying the virtual appliance occurs after the determining compliance.

5. The method of claim 1, wherein the one of the values includes a host name, wherein the one or more appliances are networked, and wherein the configuration of the one or more appliances includes a network configuration.

6. The method of claim 1, further comprising:
generating a user interface that supports a user reconfiguring the virtual appliance.

7. A non-transitory, tangible, computer-readable media having thereupon instructions which, when executed by a processor, cause the processor to execute a method for deploying a virtual appliance into a network appliance, comprising:
receiving a first configuration file of a virtual appliance, wherein the first configuration file is comprised of values for one or more input parameters for the virtual appliance comprises one or more virtual machines deployed in a first network appliance;
parsing, from the first configuration file, a value for each of the one or more input parameters for the virtual appliance;
accessing a second configuration file for a second network appliance, wherein the second network appliance is an existing network appliance, wherein the second configuration file is comprised of values for the one or more input parameters for the second network appliance;
determining, in advance of a deployment of the virtual appliance, that the virtual appliance is in compliance with the second configuration file, wherein the determining compliance comprises determining that a value for at least one input parameter parsed from the first configuration file is the same as a value for a corresponding input parameter accessed from the second configuration file, wherein the at least one input parameter is selected from a group consisting of: an Internet protocol, a domain name server (DNS), a virtual local area network (VLAN), a port group, and a gateway;
wherein the step of determining compliance is further comprised of one or more of the following steps:
determining that an Internet protocol address assigned to the virtual appliance does not conflict with another Internet protocol address;
determining that sufficient capacity to support addition of virtual machines to a domain exists in one or more domain name server (DNS) servers;
determining that sufficient capacity to support addition of virtual machines to a domain exists in a server organizational unit (OU);
determining that that a data store has correct permission to read and write;
determining that that a logical unit number (LUN) has correct permission to read and write;
determining that that a network file system (NFS) server and a path relating thereto are correct for creating and editing a NFS file system; and
determining that a host name is present in a domain;
deploying, in response to determining compliance, the virtual appliance into the first network appliance; and
configuring the virtual appliance in accordance with the value for the at least one input parameter parsed from the first configuration file.

8. The computer-readable media of claim 7, wherein the method further comprises:
determining the input parameters of the first configuration file wherein the input parameters are identified; and
requesting the values of the input parameters.

9. The computer-readable media of claim 7, wherein the values for the input parameters of the first configuration file are received via user input of the values.

10. A virtual appliance deployment system, comprising:
a computing device, including at least one processor;
at least one memory storing computer program code, wherein the at least one memory and stored computer program code are configured, with the at least one processor, to cause the system to at least:
receive a first configuration file of a virtual appliance, wherein the first configuration file is comprised of values for one or more input parameters for the virtual appliance comprises one or more virtual machines deployed in a first network appliance;
parse, from the first configuration file, a value for each of the one or more input parameters for the virtual appliance;
access a second configuration file for a second network appliance, wherein the second network appliance is an existing network appliance, wherein the second configuration file is comprised of values for the one or more input parameters for the second network appliance;
determine, prior to deploying the virtual appliance, that the virtual appliance is in compliance with the second configuration file, wherein the determining compliance comprises determining that a value for at least one input parameter parsed from the first configuration file is the same as a value for a corresponding input parameter accessed from the second configuration file, wherein the at least one input parameter is selected from a group consisting of: an Internet protocol, a domain name server (DNS), a virtual local area network (VLAN), a port group, and a gateway;
wherein the step of determining compliance is further comprised of one or more of the following steps:
determine that an Internet protocol address assigned to the virtual appliance does not conflict with another Internet protocol address;
determine that one or more DNS servers possesses sufficient capacity to support the one or more virtual machines of the virtual appliance;
determine that a data store has correct permissions to read and write;
determine that a LUN has correct permissions to read and write; and
determine that a NFS server and path relating to the NFS server are correct for creating and editing a NFS file system;
deploy, in response to determining compliance, the virtual appliance into the first network appliance; and configure the virtual appliance in compliance with the value for the at least one input parameter parsed from the first configuration file.

11. The virtual appliance deployment system of claim 10, wherein the at least one memory and stored computer program code are further configured, with the at least one processor, to cause the system to at least:

generate a user interface based on the input parameters of the virtual appliance, wherein a user can input the values of the input parameters via the user interface.

12. The virtual appliance deployment system of claim 10, the at least one memory and stored computer program code are further configured, with the at least one processor, to cause the system to at least:

identify the input parameters in the first configuration file.

13. The virtual appliance deployment system of claim 10, the at least one memory and stored computer program code are further configured, with the at least one processor, to cause the system to at least:

generate a display showing a configuration applied to the virtual appliance and showing a status of the virtual appliance.

14. The virtual appliance deployment system of claim 10, wherein the at least one memory and stored computer program code are further configured, with the at least one processor, to cause the system to at least:

send a ping, in order to validate network infrastructure.

15. The virtual appliance deployment system of claim 10, wherein the at least one memory and stored computer program code are further configured, with the at least one processor, to cause the system to at least:

check a configuration of at least one from a group consisting of a network switch, a host, and a storage, in order to verify that the virtual appliance is usable with the at least one network appliance and the network.

\* \* \* \* \*